May 15, 1945. M. M. DE CASTRO 2,376,234
REGISTERING DEVICE FOR WEIGHING APPARATUS
Filed Feb. 17, 1941 6 Sheets-Sheet 1
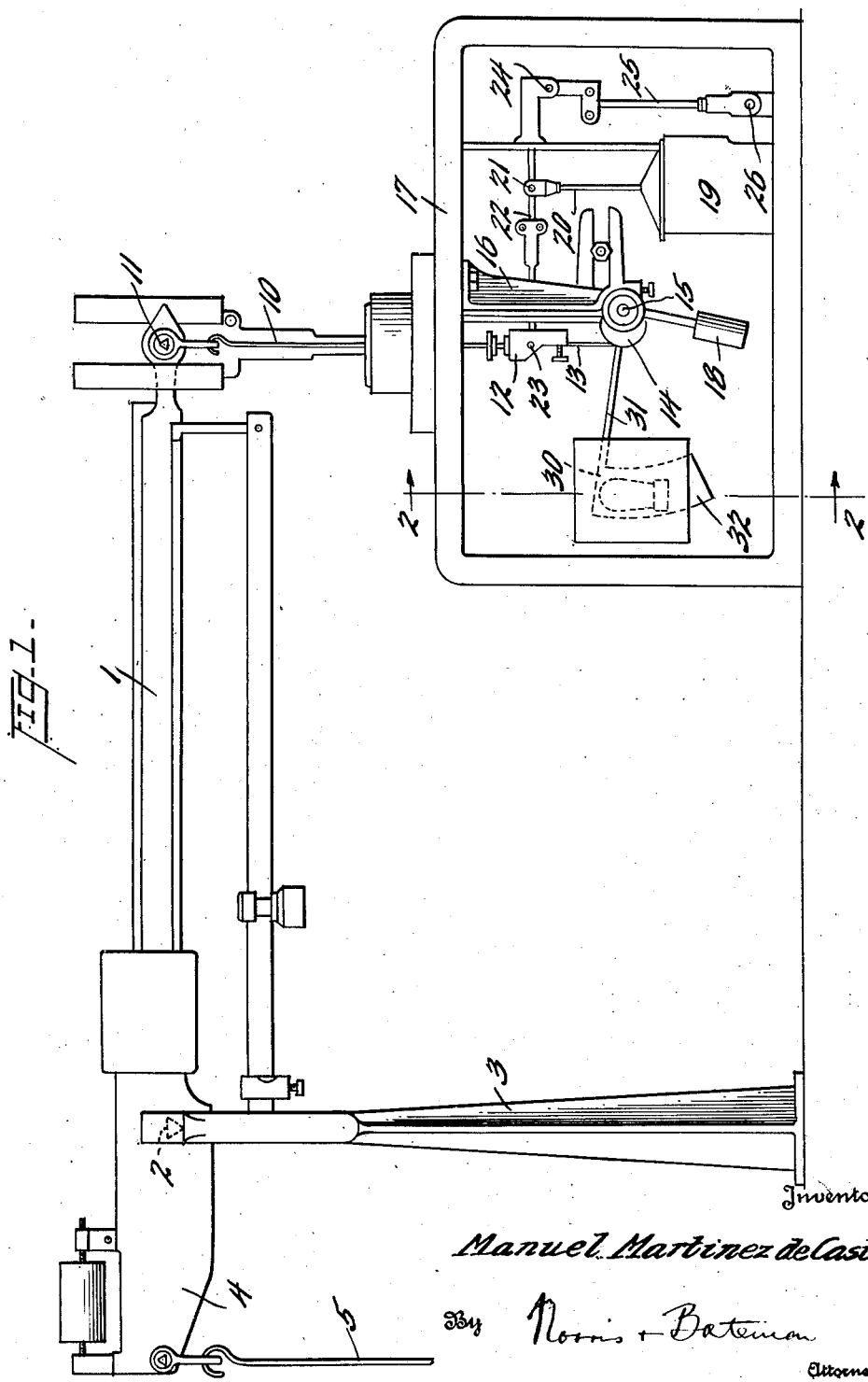
Inventor
Manuel Martinez de Castro,
By Norris + Bateman
Attorneys

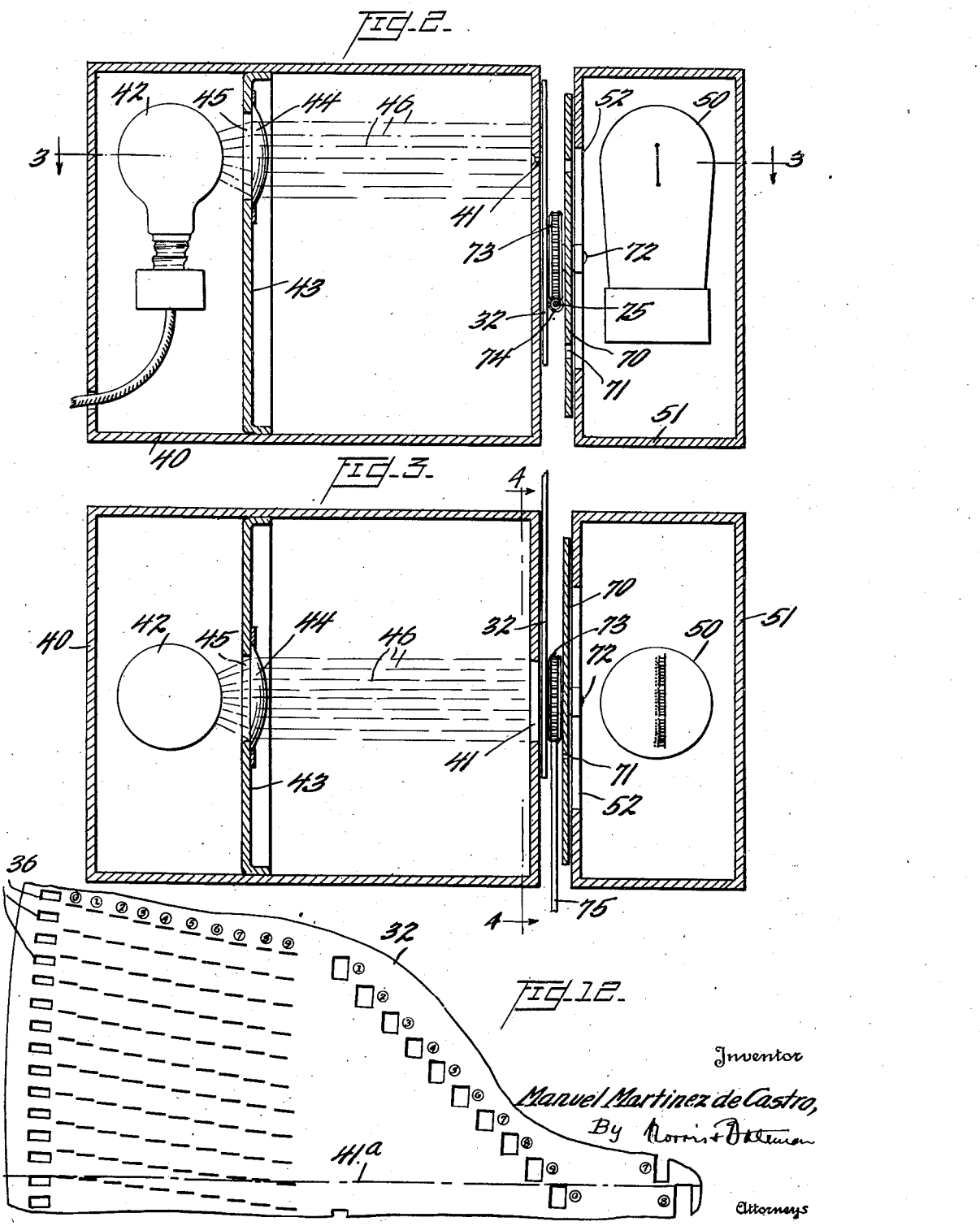

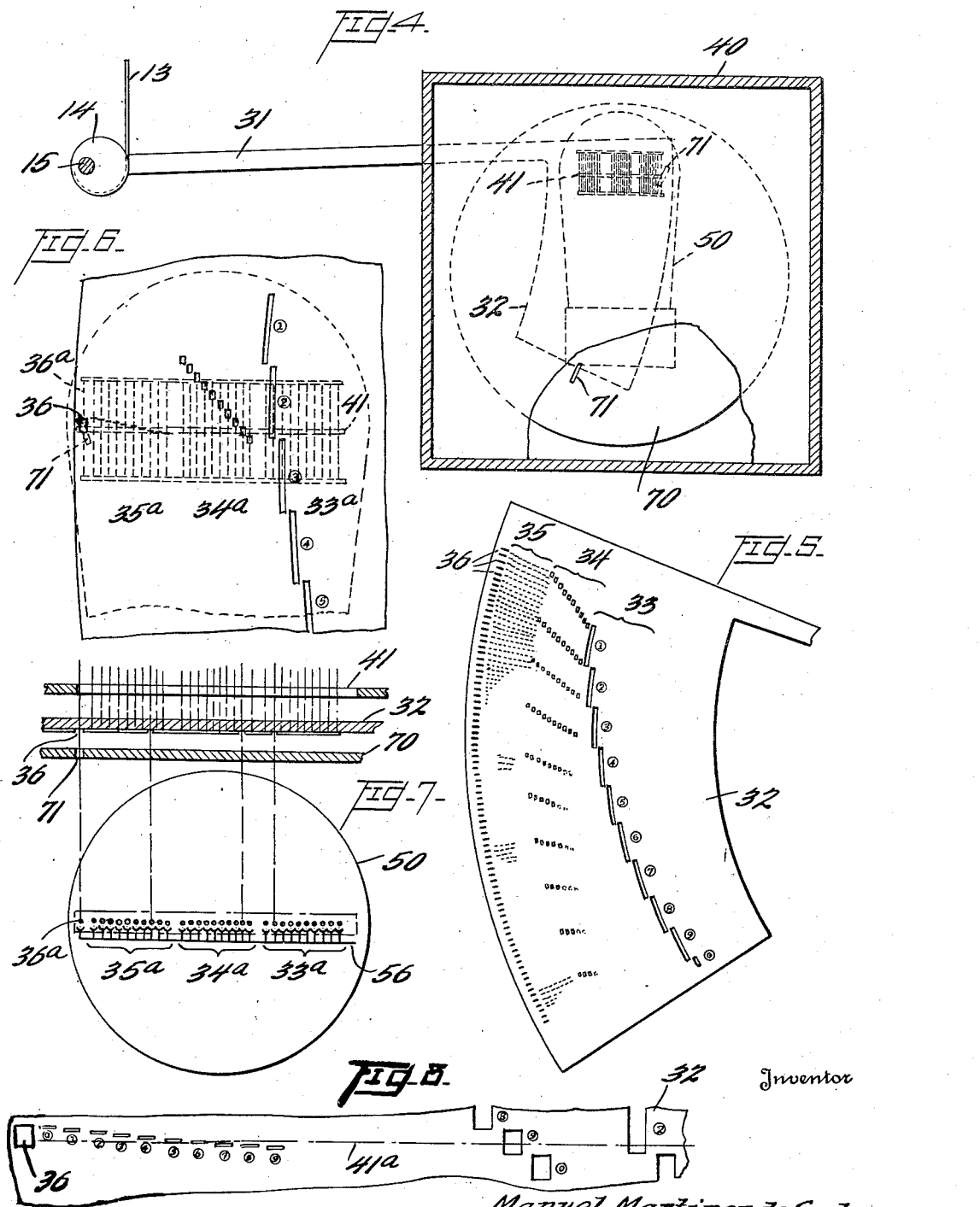

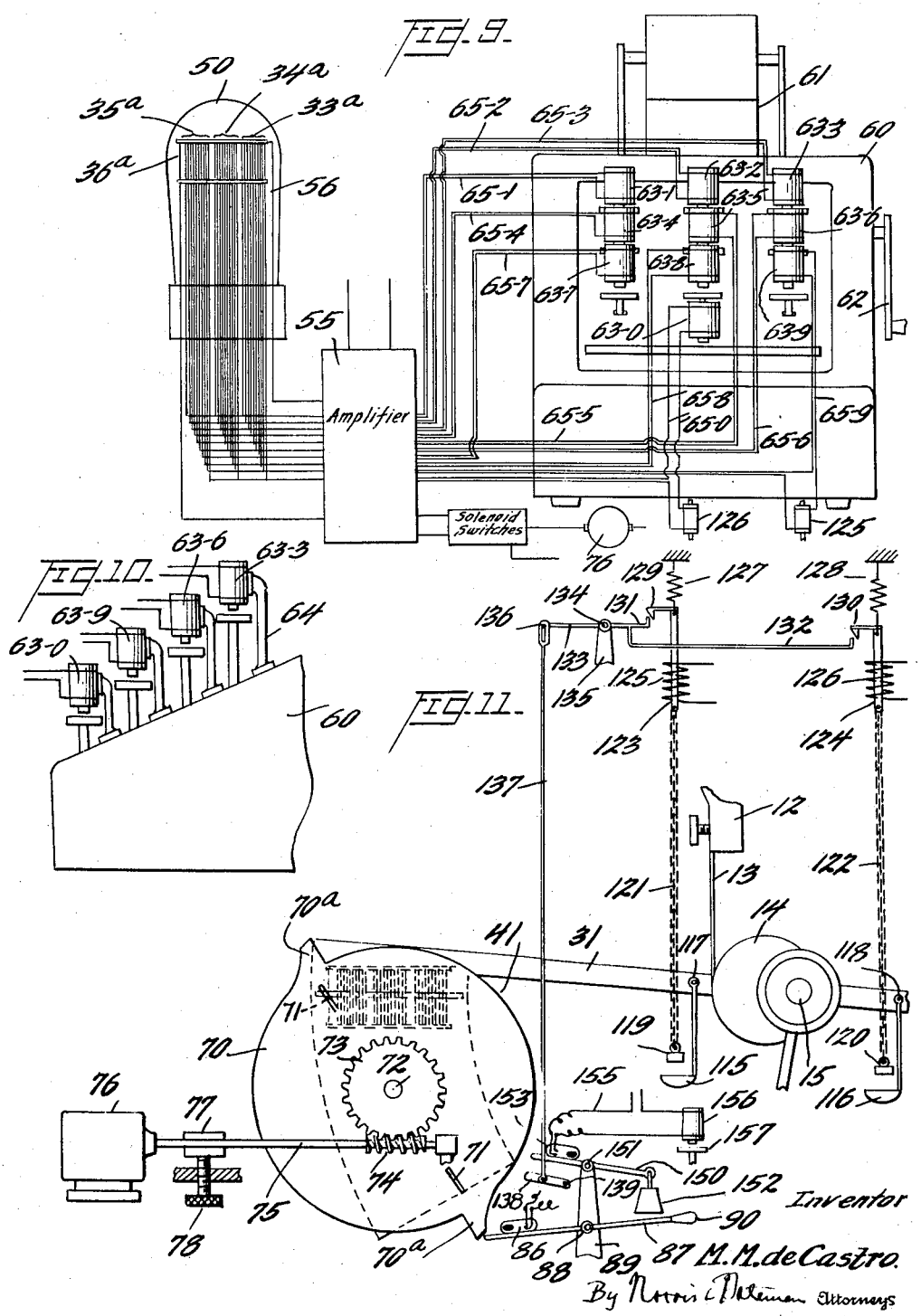

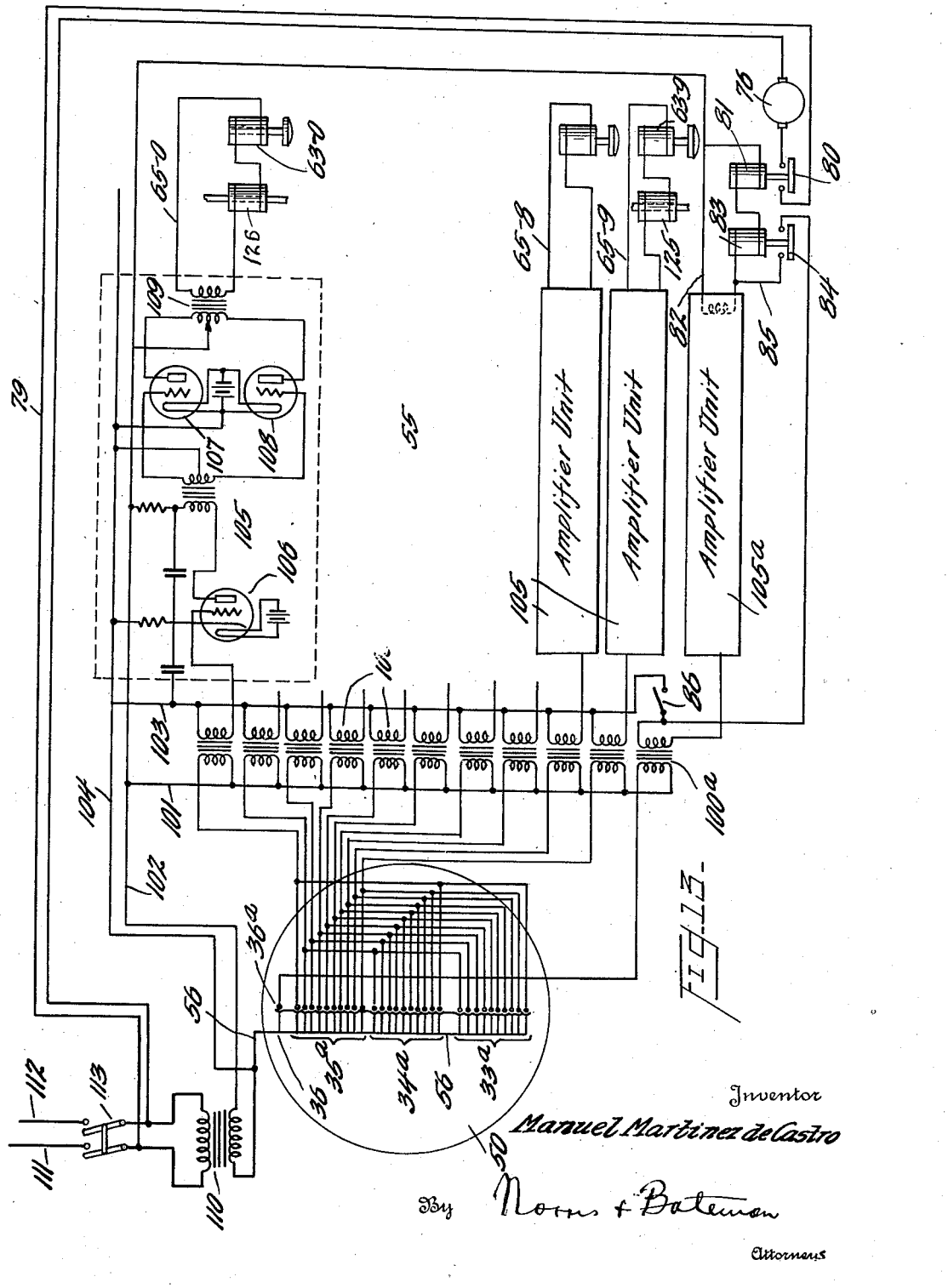

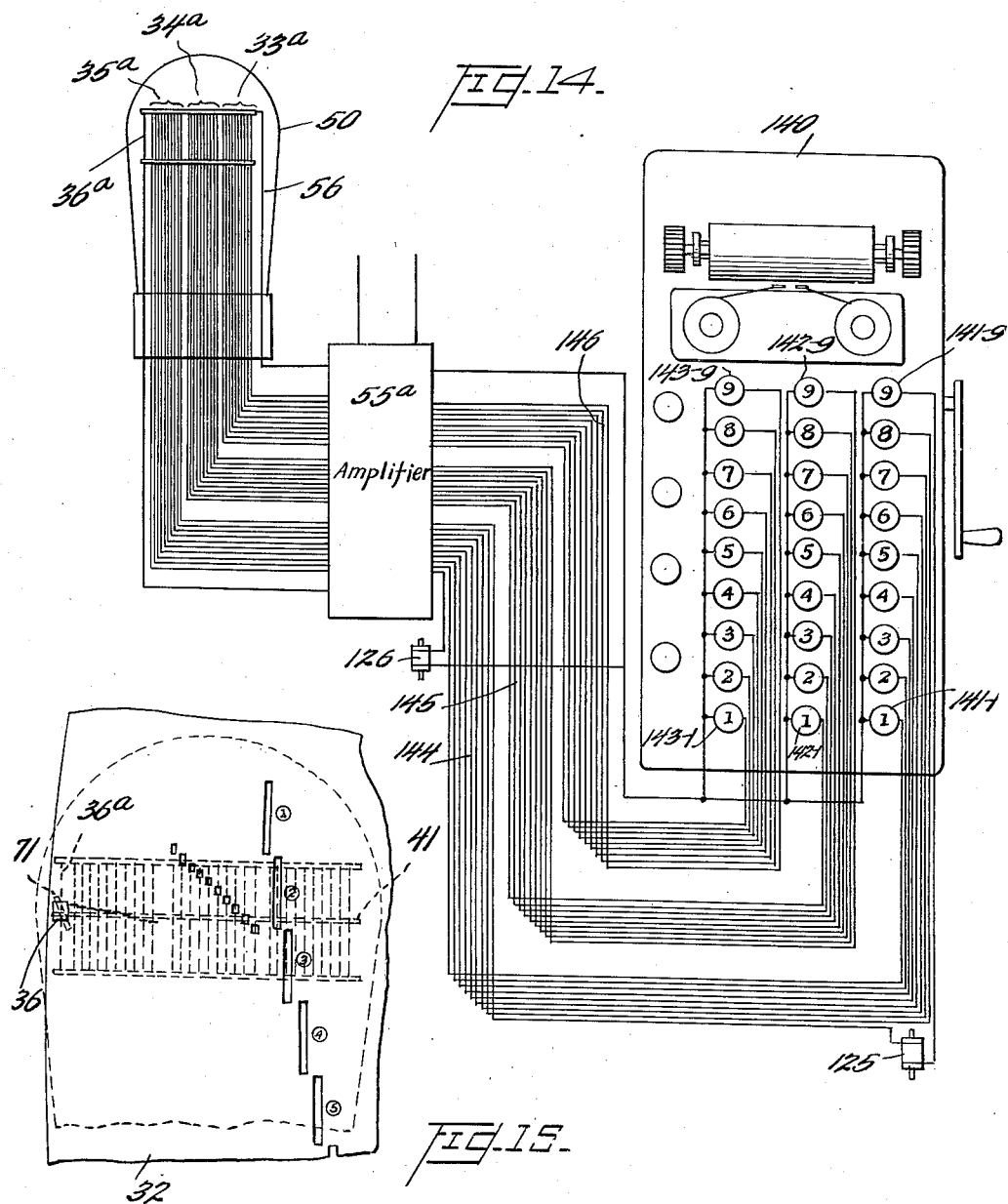

Patented May 15, 1945

2,376,234

UNITED STATES PATENT OFFICE 2,376,234

REGISTERING DEVICE FOR WEIGHING APPARATUS

Manuel Martínez de Castro, Habana, Cuba

Application February 17, 1941, Serial No. 379,364

5 Claims. (Cl. 250—41.5)

The present invention relates to registering or recording apparatus, and more particularly to an attachment for weighing machines for registering or recording the weights of the different weighings thereof.

The primary object of the invention is to provide an attachment which is capable of being applied readily to any ordinary type of beam scale or weighing apparatus and which is capable of rapidly printing or otherwise registering or recording automatically and accurately the weights of successive weighings of the scale or weighing apparatus.

A more particular object of the invention is to provide an apparatus of this character which may be readily applied to any manually operated beam scale or weighing apparatus and thereby will convert the same into a fully automatic scale which will register or record the weights of the different weighings.

Another object of the invention is to provide an apparatus of this character which is adapted to operate an adding or calculating machine or similar device or mechanism to register the weights of the different weighings or to print them on a ticket or tape or otherwise provide a record thereof.

A further object of the present invention is to provide registering or recording means for a scale or weighing apparatus the operation of which does not affect the accuracy of the weighing operations of the scale or weighing apparatus, and which avoids errors in the registering or recording of the weights of the different weighings.

To these and other ends, the invention consists in certain improvements and combinations and arrangements of parts, all as will be hereinafter more fully described, the features of novelty being pointed out more particularly in the claims at the end of this specification.

In the accompanying drawings:

Fig. 1 is an elevation of a portion of a scale or weighing apparatus showing the registering or recording attachment provided by the present invention applied thereto;

Fig. 2 is a vertical section, on an enlarged scale, taken on the line 2—2 in Fig. 1;

Fig. 3 is a horizontal section taken on the line 3—3 in Fig. 2;

Fig. 4 is a vertical section taken on the line 4—4 in Fig. 3 and looking in the direction of the arrows;

Fig. 5 is a detail view of the screen which operates in accordance with the operation of the scale or weighing apparatus and controls the registering or recording means;

Fig. 6 is a diagrammatic view showing the relationship between the electrodes of the photoelectric cell, the screen, the shutter and the light transmitting slot;

Fig. 7 is a diagrammatic view showing the manner in which the transmission of light rays to the electrodes of the photoelectric cell are controlled by the screen and shutter;

Fig. 8 is an enlarged view of that portion of the screen which is located in light transmitting relation to the slot and shutter as shown in Figs. 6 and 7;

Fig. 9 is a diagrammatic view, showing an adding machine, the key operating devices therefor, and the electrical connections between these devices and the electrodes of the photoelectric cell;

Fig. 10 is a side elevation of a portion of the adding machine and its key operating devices;

Fig. 11 is a diagrammatic view showing the means for operating the shutter disk, and means for preventing errors by the registering or recording device;

Fig. 12 is an enlarged view of a portion of the screen, indicating diagrammatically the zone in which the error preventing means operates;

Fig. 13 is an electrical diagram of the connections between the various elements of the apparatus;

Fig. 14 is a diagrammatic view, showing the invention applied to another type of adding machine; and Fig. 15 illustrates the form of light controlling screen adapted for use in the arrangement shown in Fig. 14.

Similar parts are designated by the same reference characters in the several figures.

Registering or recording mechanism according to the present invention is applicable generally to scales or weighing apparatus of various kinds, and it may be readily applied to scales or weighing apparatus of any usual manually operated type to render the same automatic. The registering or recording mechanism employed may be of any suitable kind capable of registering or printing the weights of the different weighings of the scale or weighing apparatus, and it enables ordinary or well known forms of adding machines to be employed. The preferred embodiments of the invention are shown in the present instance and will be hereinafter described in detail, but it is to be understood that the invention is not limited to the precise conestructions shown, since equivalent constructions are contemplated and such will be included within the scope of the claims.

In the present instance, the invention is shown applied to an ordinary form of scale or weighing apparatus comprising a weigh beam 1 which is fulcrumed by its knife edges 2 on a suitable stationary support 3, the load end 4 of this beam being connected for example by a rod 5 to a hopper, platform or other means to receive the loads to be weighed and which may be of any usual or well known construction, illustration of which is deemed unnecessary.

Registering or recording mechanism provided by the present invention in connected to the outer end of the weigh beam and, in the present instance, it renders the operation of the scale automatic. As shown, a rod 10 is suspended from knife edges 11 adjacent to the outer or free end of the beam, this rod being attached to a block 12 having a flexible tape 13 attached thereto. This tape is attached at its other end to and engages the periphery of an eccentric 14 which is fixed to a shaft 15, the latter being journalled to rotate in bearings in a suitable bracket 16 which is bolted or otherwise secured in a relatively fixed casing 17. A pendulum weight 18 is fixed to the shaft 15, it occupying a lowered position when the outer end of the scale beam is down, and swinging upwardly more or less when the outer end of the scale beam rises under the influence of the weight of a load on its load end. By this arrangement, when there is no load on the load end of the weigh beam, its free end will be down and the pendulum weight 18 will occupy its lower position, but when a load is imposed on the load end of the weigh beam, the outer or free end thereof will rise, causing the tape 13 to act on the eccentric 14 to rotate the shaft 15 and thereby swing the pendulum weight 18 upwardly until it balances or is in equilibrium with the load on the weigh beam, the latter being then in balance. A dashpot 19 is preferably provided to dampen the oscillations of the weigh beam as it approaches its balanced or poised position, thereby enabling the scale or weighing apparatus to operate rapidly. The plunger 20 of the dashpot may be connected in any suitable way to the scale or weighing apparatus, as by pivoting it at 21 to a lever 22 one end of which is pivotally connected to the block 12 at 23 and the other end of which is pivotally connected at 24 to a link 25 the lower end of which may be pivoted at 26 to the lower portion of the casing 17, so that the dashpot plunger will move in unison with the movements of the weigh beam and will dampen the oscillations thereof without however affecting the accuracy of the weighing operations.

The registering or recording means provided by the present invention comprises a screen which is movable in accordance with the movements of the weigh beam in performing its weighing operations, light sensitive means controlled by the screen, and registering or recording means controlled by the light sensitive means.

Preferably and as shown in the present instance, the screen comprises a sector 30 having an arm 31 which is fixed to and extends radially from the shaft 15 so that it will swing more or less in accordance with the rotative movements of the shaft 15 under the influence of the weigh beam. The screen is preferably in the form of a segment 32 which is provided with slots or light transmitting windows arranged appropriately in accordance with the weights of various loads weighed by the scale or weighing apparatus. As shown in the present instance, the sector is provided with a series of concentric arcuately spaced and inwardly stepped slots or windows 33, a plurality of series of arcuately spaced and inwardly stepped slots or windows 34, each of these series being included within the arcuate length of one of the slots or windows of the series 33, and a plurality of arcuately spaced inwardly stepped series of slots or windows 35, each of the latter series being included within the arcuate length of one of the slots or windows of the series 34. These series of slots or windows correspond with units of weight, such as pounds or kilograms, and the different series of these slots or windows correspond with different denominations of numbers. As shown, each series of the slots or windows 35 correspond with "units" of the decimal system, there being ten of these slots or windows in each series which occupy the arcuate space on the sector equal to that occupied by one of the slots or windows of the series 34. The slots or windows of the series 34 correspond with the "tens" denomination, there being ten of these slots or windows in each series which occupy an arcuate space on the sector equal to that occupied by one of the slots or windows of the series 33. The slots or windows of the series 33 correspond with the "hundreds" denomination, there being for example ten of these slots or windows in this series. With this arrangement of series of slots or windows, weights varying by units may be registered or recorded in all numbers including three decimals or denominations, but obviously the number of series of slots or windows may be increased, in accordance with the system disclosed, if numbers comprising more than three decimals or denominations are to be registered or recorded. In addition to the series of slots or units described, the sector is preferably provided with another series of slots or windows 36 for causing operation of the registering or recording means automatically when the scale or weighing apparatus comes to a balance, this series of slots or windows being concentric with the pivotal axis of the sector and spaced circumferentially thereof at intervals opposite the series of slots or windows 35.

The series of slots or windows 33, 34, 35 and 36 in the sector 32 are capable of transmitting light therethrough but the remainder of the sector is opaque or of non-light transmitting character. The sector may therefore be made of a sheet of thin metal having the series of slots or windows punched therethrough or it may be composed of a transparent material such as glass or Celluloid having a black coating thereon which covers its entire surface excepting the areas occupied by the series of slots or windows, these areas being left uncovered for the transmission of light therethrough.

The sector 32 is mounted to swing vertically in front of a box 40 the forward wall of which is provided with a horizontal slot 41 which is of a length somewhat less than the radial dimension of the sector and is of a width or vertical height substantially equal to the vertical height of each of the slots or windows of the series 35 so that the slot 41 will expose only one of these slots or windows at a time. The box 40 contains a source of light, such as an electric lamp 42, and it is provided with a partition 43 having a light collecting lens 44 mounted in front of an aperture 45 opposite to the lamp, so that light emitted from the lamp will be collected by the lens 44 and projected in parallel rays 46 toward the front of the box and the slot 41 therein. The sector 32 is located to operate immediately in front of the slot 41 so that all light will be excluded from the rear of the sector except that which is admitted through the slot 41.

A photoelectric or other light sensitive cell 50 is mounted, as in a light-tight box 51, in front of the sector 32 and box 40, the box 51 having an opening 52 therein for the admission of light from the lamp 42 to the photoelectric cell. The photoelectric cell employed in carrying out the present invention may be similar to photoelectric cells of the well known type commonly used, with the exception that it contains sets of light sensitive cathodes and individual cooperating anodes in the form of filaments which are arranged in a row in alinement with the slot 41. These cathodes and filaments are grouped in banks 33$^a$, 34$^a$ and 35$^a$ corresponding with the groups or columns of slots or windows 33, 34 and 35 respectively of the sector 32, the cathodes and filaments in the bank 33$^a$ being spaced apart at intervals corresponding with the spacing of the slots 33 radially of the sector, the cathodes and filaments in the bank 34$^a$ being spaced apart at intervals corresponding with the spacing of the slots 34 radially of the sector, and the cathodes and filaments in the bank 35$^a$ being spaced apart at intervals corresponding with the spacing of the slots 35 radially of the sector. Accordingly, each cathode and cooperating anode or filament of the photoelectric cell will receive a beam of light from the lamp 42 when a corresponding slot or window in the respective groups 33, 34 and 35 of the sector is brought into register or alinement with the slot 41. All of the filaments and cathodes are enclosed in an evacuated transparent bulb as usual, and the cathodes are all connected to a common conductor 56 (Fig. 9) which leads into an amplifier 55, which may be of the type commonly used with photoelectric cells or radio receivers, to amplify the variations in current flowing between the individual cathodes and the respective anodes or filaments of the cell incident to variations in light received by them. The filaments or anodes of the photoelectric cell are all insulated from one another and connected individually by separate conductors to the amplifier, as shown in Figs. 9 and 13, so that variations of the currents flowing in the individual filaments or anodes may be amplified separately. In the arrangement shown in these figures however, the filaments or anodes of corresponding order in the different banks may be connected together so that as each bank contains ten filaments, making thirty filaments for the three banks, it is necessary to employ only ten conductors to connect the filaments to the amplifier.

The amplifier employed may be of any suitable type but provided with a plurality of individual amplifying units or circuits for the different anodes or filaments of the photoelectric cell, it comprising for example a set of input transformers 100 each having its primary connected at one terminal to the respective anode or filament of the photolectric cell and connected at its other terminal by a common conductor 101 to one side 102 of a power circuit, the secondary of each transformer having one of its terminals connected by a common conductor 103 to the other side 104 of said power circuit, and having its other terminal connected to a vacuum tube amplifier unit 105 which may be of any known type having a suitable number of stages. As shown, each amplifier unit is of the vacuum tube type comprising a vacuum tube 106 having its input connected to the respective transformer 100 and its output coupled to the inputs of a pair of vacuum tubes 107 and 108 the outputs of which are connected to the primary of an output transformer 109. The power circuit 102, 104 may be supplied with current at a suitable voltage from any appropriate source, it being shown in the present instance as supplied through a transformer 110 from main alternating current power lines 111 and 112 controlled by a main hand switch 113.

In the arrangement shown in Fig. 9, an ordinary and well known form of adding machine 60 of the ten-key type is employed as the registering or recording device, the ten keys of such a machine being grouped usually as shown and controlling the printing of a number on a tape 61 by operation of a crank 62. In employing an adding machine of that type, a set of ten solenoids 60—0, 63—1, 63—2, 63—3, 63—4, 63—5, 63—6, 63—7, 63—8 and 63—9 are mounted, as by suitable brackets 64, above the keyboard of the adding machine so that they will operate to depress the respective keys when energized. These solenoids are electrically connected by the separate pairs of conductors 65—0, 65—1, 65—2, 65—3, 65—4, 65—5, 65—6, 65—7, 65—8 and 65—9 to the respective output transformers 109 of the amplifier units 105 corresponding with the input conductors leading from the filaments or anodes of the photoelectric cell. Accordingly, an electrical impulse resulting from the impingement of a light ray upon a cathode or light sensitive electrode of corresponding order in any one of the banks in the photoelectric cell will be amplified by the amplifier in the usual and well known manner and will cause the corresponding solenoid to be energized, thereby depressing the corresponding key of the adding machine to register the corresponding numeral.

Since, in the arrangement shown in Fig. 9, there is one set of keys and solenoids which is common to three sets or groups of electrodes in the photoelectric cell, and the filaments of corresponding order are connected together, means is provided for causing the adding machine to register and print in proper order the numerals of different denominations and composing the number of units of weight of the load weighed by the scale or weighing apparatus. Preferably and as shown in the present instance such means comprises a disk 70 which is opaque to light but is provided with one or more radial slots 71, a pair of these slots in diametrically opposite relation being shown, and the disk is mounted on a shaft 72 for rotation immediately in front of the sector 32 and immediately in rear of the light admitting opening 52 in the box containing the photoelectric cell, the disk providing a light-tight closure for this box and admitting light thereto only through one or the other of the slots 71. Each of the slots 71 is of a circumferential width equal substantially to the width of one of the slots or windows of the sector 32, measured in a direction radially thereof, so that as the disk 70 rotates, the slot 71 will traverse the length of the slot 41 and it will permit light rays to pass only successively through those slots or windows in the groups or columns 33, 34 and 35 of the sector which are alined with the slot 41. Assuming that the disk 70 normally occupies the position shown in Fig. 6, rotation of the disk in a clockwise direction will cause the slot 71 to traverse the length of the slot 41, and in so doing, to permit transmission of a light ray first through that slot or window in the group 35 in the sector corresponding to the "units" denomination which registers with the slot 41 and the impingement of such light ray upon the corresponding cathode or light sensitive electrode of the group 35ᵃ of the photoelectric cell, to next permit transmission of a ray of light through that slot or window of the group 34 in the sector corresponding to the "tens" denomination which registers with the slot 41 and the transmission of such light ray to the corresponding cathode or light sensitive electrode of the group 34ᵃ of the photoelectric cell, and to then permit transmission of light through that slot or window of the group 33 in the sector corresponding to the "hundreds" denomination which is in register with the slot 41 and the transmission of such light ray to the corresponding cathode or light sensitive electrode of the group 33ᵃ of the photoelectric cell. Assuming for example that the sector is brought into the position shown in Fig. 8 when the scale or weighing apparatus is balanced under the influence of a load thereon, that the line 41ᵃ represents the position of the slot 41 relatively to the sector and that when the sector assumes this position the slot or window of the "hundreds" group 33 representing the numeral 2, the slot or window in the "tens" group 34 representing the numeral 9 and the slot or window in the "units" group 35 representing the numeral 7 register with the slot 41, the total number representing the units of weight of the load will be "297." As the slot 71 in the disk 70 traverses the slot 41 during clockwise rotation of the disk (Fig. 6), light rays will pass successively and in order through the slots or windows "7," "9" and "2" thereby exposing the corresponding cathodes or light sensitive electrodes of the groups 35ᵃ, 34ᵃ and 33ᵃ to these light rays and causing the solenoids 63—7, 63—9 and 63—2 to be energized successively and in that order, thereby depressing the keys in such order. The adding machine however will be so operative as to assemble its printing members toward the left instead of toward the right as the keys are actuated, so that the printing member for the numeral "7" will first assume printing position, then the printing member for the numeral "9" will assume printing position to the left, and then the printing member for the numeral "2" will assume printing position to the left of the previously positioned printing members, so that the number "297" will be printed by the adding machine in the usual and well known way in this type of adding machine, when the lever 62 is operated. As the slot 71 in the disk 70 passes a slot or window in the sector which registers with the slot 41, the light ray through the slot or window in the sector is immediately interrupted so that the corresponding solenoid of the adding machine is immediately deenergized to permit its corresponding key to rise immediately and in readiness for another actuation thereof. It will be understood that during the traverse of the slot 41 by the slot 71 of the disk 70, all light rays passing through the slot 41 will be intercepted by the opaque sector excepting the areas thereof which are occupied by the light transmitting slots or windows which register with the slot 41.

Means is provided for releasing or actuating the disk 70 so that a slot 71 therein will traverse the slot 41 when the scale or weighing apparatus has come to a balance under the load thereon, and for preventing operation of the disk 70 until such a balance has been reached. For this purpose, controlling means is provided for the disk which renders the latter operative only as one or another of the slots or windows in the series 36 in the sector comes to rest in register with the slot 41. Such controlling means for the disk 70 is photoelectrically controlled by the slots or windows 36, either by a separate photoelectric cell of the usual and well known type or by an additional or supplemental filament or anode 36ᵃ which may be embodied in the photoelectric cell 50 in a position where it and its cathode will receive a light ray through the slot 41 and one of the windows 36 in the sector as the sector comes to rest with one of these windows therein in register with the slot 41. The means for controlling or actuating the disk 40 by such photoelectric means is preferably as follows:

While the shutter disk 70 is in its normal position prior to a scanning operation, as shown in Fig. 6, one of the slots 71 therein for scanning the slots in the sector 32 is alined with the slot 41 and will be opposite to the row of slots 36 in the sector, as shown in Fig. 6, it being understood that the disk 70, at each operation thereof, rotates a half revolution in a clockwise direction as shown in this figure. The disk 70 is driven by a worm wheel 73 fixed thereto and meshing with a worm 74, the shaft 75 of which is driven by an electric motor 76, a friction brake 77 adjustable by a screw 78 being provided, for stopping the disk in proper position after each scanning operation.

The motor 76 is supplied with its operating current from a power line or other suitable source of current through a circuit 79 which is controlled by an electro-magnetic switch 80 which is normally open but is closed when its electromagnet or solenoid 81 is energized. This solenoid is controlled by the following means: the anode 36ᵃ of the photoelectric cell, which is controlled by the slots 36 in the screen 32, is connected to the primary of the input transformer 100ᵃ of the amplifier unit 105ᵃ the output circuit 82 of which is connected to the winding of a solenoid 83 which is in series in this circuit with the winding of the solenoid 81, the solenoid 83 operating, when energized, to close a switch 84. The switch 84 controls a holding circuit 85 for the solenoid 83, this holding circuit being closed by a mercury switch 86 (Fig. 11), it being connected to one terminal thereof, the other terminal of this switch being connected to the side 104 of the power circuit which supplies current of a suitable voltage.

The switch 86 is mounted on a lever 87 which is pivoted at 88 on a relatively fixed support 89 and has a handle 90 on its free end, this lever and switch being so balanced that they are in equilibrium in all positions and hence will remain in the different positions into which they are moved. The shutter or scanning disk 70 is provided on its periphery with a pair of cam projections 70ᵃ, located at diametrically opposite points, and the switch carrying end of the lever 87 projects into the path of these projections, so that when the handle 90 at one end of this lever has been moved into its lower position, thereby rocking the switch 86 into circuit closing position, rotation of the disk 70 will cause one of the projections 70ª thereon to engage the other end of the lever 87 and rock it into a position to open the switch 86 and thereby open the circuit 85.

The mode of operation of the shutter controlling and operating means is as follows: assuming the shutter to occupy the position shown in Fig. 6 ready to start scanning the slots in the sector 32 which are alined with the slot 41, that the weighing apparatus has come to balance and the sector 32 is at rest in a position corresponding to the load on the weighing apparatus, and that the handle 90 of the lever 87 is in its normal raised position, a steady and strong ray of light passing through the slot 41, the slot 36 in the sector which is at rest and through the slot 71 of the shutter will impinge upon the photoelectric cell filament or anode 36ª and its respective light sensitive cathode, thus causing a current to flow therefrom to the transformer 100ª, but if the switch 86 is open, such current will not be amplified to energize the solenoids 81 and 83 and close the switches 80 and 84 since the switch 86 connects the transformer 100ª to the power circuit and the motor 76 therefore will not start and the disk 70 will remain at rest. However, as soon as an attendant pulls the handle 90 down, thus closing the switch 86, and as soon as a steady beam of light strikes the filament 36ª and its cathode, a current of sufficient strength flows from the power circuit through the transformer 100ª and amplifier unit 105ª and then through the solenoids 81 and 83 to close the switches 80 and 84, thereby completing the operating circuit 79 of the motor 76, and the latter is thereby set into operation to drive the disk 70 in a clockwise direction in Figs. 6 and 11, thereby causing the slot 71 to scan the slots in the sector 32 which are alined with the slot 41 and causing the keys of the adding machine to be set or operated in proper order as has been hereinbefore described.

Although the slot 71 in the shutter disk 70 which was opposite to one of the slots 36 in the sector and the filament or anode 36ª of the photoelectric cell when the weighing machine came to balance preparatory to the scanning operation will move out of register with the slot 41 and the filament 36ª as soon as the disk 70 starts its scanning movement, thus cutting off the ray of light to the filament 36ª, the operating circuit for the disk driving motor is maintained through the closed switch 86 which receives current from the conductor 104 of the power circuit and which continues the energizing of the solenoid 83 which thereby holds the switch 84 of the holding circuit 85 closed so that the solenoid 81 is supplied with current to maintain the motor circuit switch 80 closed while the switch 86 remains closed.

After the shutter disk 70 has rotated nearly a half revolution or sufficiently to cause the appropriate slot 71 therein to scan those slots 35, 34 and 33 in the sector 32 which register with the slot 41 and to cause rays of light to impinge upon the corresponding electrodes of the banks 35ª, 34ª and 33ª of the photoelectric cell, its continued rotation brings one of its peripheral projections 70ª into engagement with the adjacent end of the lever 87, thereby rocking this lever in a direction to raise the handle 90 and open the switch 86, the latter thus breaking the holding circuit 85 and deenergizing the solenoids 81 and 83 and opening the switches 80 and 84 and cutting off the operating current to the shutter driving motor 76. Although the motor 76 will not stop instantly, but will over-run due to the inertia, thus continuing the rotation of the disk somewhat further, such over-run is graduated or regulated by the friction brake 77 which is adjusted to stop the disk 70 at the point where the next slot 71 therein will be in the position shown in Figs. 6 and 11 to commence the next scanning operation. This slot 71 will then be in a position where it will again register with the slots 36 in the sector 32 and these slots will register successively with the slot 71 while the weighing operation is taking place, but these successive momentary rays of light will not be sufficiently strong to cause the amplified current from the filament 36ª to have sufficient strength to close the switch 84, so that if the handle 90 were operated accidentally or erroneously before a weighing has been completed, the shutter disk 70 will not operate to actuate the adding machine. As soon as the weighing has been completed however, the sector 32 comes to rest and brings the appropriate slot 36 in register with the slot 71 in the shutter disk and filament 36ª, and the strong steady light beam impinging upon this filament will cause current therefrom to be amplified by the amplifier sufficiently to energize the solenoid 83 to close the switch 84, assuming the handle 90 has been lowered manually by the attendant to close the switch 86, thereby setting the shutter disk into operation, as has been described.

Means is provided to prevent the occurrence of errors in the actuation of the keys of the adding machine, as tend to take place due to vibration of the screen 32 as the latter approaches a balance with the slot 41 located between the slots of one or another set in the sector corresponding to the numeral "9" or "0", as indicated diagrammatically in Fig. 12 in which the line 41ª represents the relation of the slot 41 with the sector 32. Such error correcting means, as shown in the present instance comprises a pair of pans 115 and 116 pivotally suspended from the sector arm 31 at the points 117 and 118 located respectively at opposite sides of the center of the sector shaft 15, and a pair of weights 119 and 120 suspended respectively from chains or other flexible members 121 and 122. The upper ends of these chains are attached to the cores 123 and 124 of a pair of solenoids 125 and 126 respectively and are pulled upwardly and normally held in elevated positions out of contact with the pans 119 and 120 by suitably arranged springs 127 and 128, the solenoid cores being pulled downwardly when their respective solenoids are energized, thereby lowering the weights 119 and 120 onto the respective pans 115 and 116. The solenoid 125 is connected in the circuit 65—9 in series with the solenoid 63—9 which actuates the "9" key of the adding machine, and the solenoid 126 is connected in the circuit 65—0 in series with the solenoid 63—0 which actuates the "0" key of the adding machine, as shown in Fig. 13.

The cores 123 and 124 of the solenoids 125 and 126 have latch projections 129 and 130 respectively thereon, and these projections are arranged for cooperation respectively with a pair of arms 131 and 132 of a trigger 133, the latter being pivoted at 134 on a relatively fixed support 135, and operatively connected through a loose pivot joint 136 to a rod 137, the latter being pivotally connected at its lower end to a lever 138 which is pivoted at one end, as at 139, to a relatively fixed support and has its other end arranged to project into the path of one or the other of the cam projections 70ª on the periphery of the shutter disk 70. The trigger 133, rod 137 and lever 138 are so balanced that as soon as each cam projection 70ᵃ on the shutter disk passes, the end of the lever 138 will return to a position against the periphery of the shutter disk and thereby hold the trigger in its normal horizontal position. While the trigger is in such a position, the latch projection 129 or 130 of the solenoid core 123 or 124 will latch past and engage beneath the respective trigger arm 131 or 132 when the corresponding solenoid is energized, and the trigger will thus retain the respective weight 119 or 120 in its lowered position and resting on the respective pan 115 or 116, until rotation of the shutter disk brings one of its cam projections into engagement with the lever 138 and rocks it downwardly. Such operation of lever 138 pulls the rod 137 down and swings the trigger arms 131 and 132 upwardly in arcs which will free the projection 129 or 130 engaged beneath one or the other of these arms and thereby permit the weight 119 or 120 to be lifted from the respective pan 115 or 116. The trigger then returns to its normal horizontal position ready for the next weighing operation.

It will be seen that by this arrangement, the weight 119 will be lowered to exert its influence upon the sector 32 tending to lower it after it has reached substantially a balance position under the load on the scale or weighing machine, if the solenoid 125 in circuit with the solenoid 63—9 which actuates the "9" key of the adding machine is energized, and that the weight 120 will be lowered to exert its influence upon the sector 32 tending to raise it after it has reached substantially a balance position under the load on the scale, if the solenoid 126 in circuit with the solenoid 63—0 which actuates the "0" key of the adding machine is energized.

The functioning of such error preventing means can be understood by reference to the enlarged portion of the sector 32 as shown in Fig. 12. Assuming that the slots in the row 35 corresponding to "units" denomination, the slots in the row 34 corresponding to "tens" denomination, and the slots in the row 33 corresponding to "hundreds" denomination are all graduated in the order indicated by the numerals in this figure, which have been applied thereto for explanatory purposes only, it will be observed that when the light transmitting slot 41, represented in this figure by the line 41ᵃ, is between or intersects one or the other of the terminal slots of adjacent sets in the "units" row, as for example, the slot in one set corresponding to the units numeral "9" and the slot in the next lower set corresponding to the numeral "0," the line of intersection of the slot 41 will pass in close adjacency to both the slot in the "tens" row corresponding to the numeral "9" and the next slot in this row corresponding to the numeral "0"; and also, that the line of intersection of the slot 41 will, under these conditions, pass in close adjacency to both the upper slot and the next lower slot in the row 33 corresponding to "hundreds" denomination. If the sector 32 came to substantial balance, under the load on the scale, with its slots in such a position relatively to the slot 41 as that indicated by the line 41ᵃ in Fig. 12, it will be appreciated that a relatively small vibration of the sector, either upwardly or downwardly, would alter, sometimes considerably, the response of the adding machine to the scanning of the slots of the sector, it being noted that vibration of the sector through a relatively small distance would bring about an error of ten units in the "tens" row and one hundred units in the "hundreds" row. Such errors are prevented by the weights 119 and 120 which are brought into operation automatically when the sector assumes certain positions in balancing the load on the scale.

Assuming, for example that the load on the scale is at or slightly above 799 pounds, and that the sector 32 has assumed the position shown in Fig. 12 when the scale comes to balance under the load thereon, as the slot 71 of the shutter disk scans the slots in the sector 32 from left to right in Fig. 12, the keys of the adding machine should be actuated to set up the number "799" for printing. However, if the sector 32 is vibrated upwardly or downwardly during the scanning of the slots therein, the slot in the sector corresponding to either "0" or "9" of "units" denomination might be exposed to the slot 41, causing the adding machine to set up either "0" or "9" in the "units" column for printing, the slot in the sector corresponding to either "0" or "9" of "tens" denomination might be exposed to the slot 41, causing the adding machine to set up either "0" or "9" in the "tens" column for printing, and to cause either the slot in the sector corresponding to "7" or "8" of "hundreds" denomination to be exposed to the slot 41, causing the adding machine to set up either "7" or "8" in the "hundreds" column for printing.

The error preventing means provided by the present invention avoids the occurrence of such errors in all denominations higher than the units denomination, and any error in the "units" denomination will be within the tolerance of one pound or other unit. In employing such means, taking for example, a weighed load of or slightly above 799 pounds, as soon as the sector 32 comes to a steady position upon the balancing of the load on the scale the shutter disk 70 will start to rotate in a direction to cause its slot 71 to scan first the slot in the "units" row of the sector corresponding to the numeral "9," thus causing the solenoid 63—9 to be energized to actuate the "9" key of the adding machine, but as the operating circuit 65—9 for this solenoid also includes therein the solenoid 125 controlling the weight 119, the latter solenoid will be simultaneously energized, causing the weight 119 to be lowered onto the pan 115. The influence of the weight 119 thus added to the sector 32 is to lower the sector to a small extent before the shutter disk has scanned the slots in the sector corresponding to the "tens" and "hundreds" denominations. The effect of thus lowering the sector is to bring the slot therein corresponding to the numeral "9" in the "tens" denomination and the slot corresponding to the numeral "7" in the "hundreds" denomination well within exposing range of the slot 41 while, at the same time, removing from the range of exposure of the slot 41 the slot in the sector corresponding to the numeral "0" in the "tens" denomination and the slot therein corresponding to the numeral "8" in the "hundreds" denomination. Although such lowering of the sector under the influence of the weight 119 will alter the position of the slots in the sector corresponding to numerals of "units" denomination, such is of no consequence because the slot of "units" denomination is scanned before the weight 119 is applied to lower the sector. Subsequent scanning of the slots in the sector corresponding to the "tens" and "hundreds" denominations will insure exposure of the slot corresponding to the numeral "9" of "tens" denomination and the slot corresponding to the numeral "7" of "hundreds" denomination to the slot 41, with no possibility of vibration of the sector to expose the slot in the sector corresponding to the numeral "0" of "tens" denomination or the slot corresponding to the numeral "8" of "hundreds" denomination. Setting up and printing of the number "799" by the adding machine is thus assured. Similarly, if the weight is at or nearly 800 pounds, or the slot in the sector corresponding to the numeral "0" is first scanned by the shutter disk, the solenoid 126 in series with the solenoid in the circuit which actuates the key of the adding machine to set it to print "0" is energized before the shutter disk has scanned the slots of "tens" and "hundreds" denominations. Such energizing of the solenoid 126 causes the weight 120 to be lowered onto the pan 116 and thereby exert its influence on the sector 32 to raise it to a small extent. Consequently, as the shutter disk completes the scanning of the sector, it will expose the slot corresponding to the numeral "0" of "tens" denomination and the slot corresponding to the numeral "8" of "hundreds" denomination, with no possibility of vibration of the sector to expose the slot in the sector corresponding to the numeral "9" of "tens" denomination or the slot corresponding to the numeral "7" of "hundreds" denomination. Setting up and printing of the number "800" by the adding machine is thus assured. Operation of the weights 119 and 120 for the setting up and printing of numerals other than "0" and "9" is unnecessary because the slots for other numerals are intermediate those for the "0" and "9" numerals, and when these other slots are exposed to the slot 41, the proper slots for the numerals of the higher denominations are well within the range of exposure of the slot 41 and will not be displaced therefrom by vibration of the sector.

Although the solenoid 125 or 126 will be deenergized as soon as the slot corresponding to the numeral "9" or "0" has been scanned, the respective weight 119 or 120 will not be removed from its respective pan but will remain thereon during the remainder of the scanning operation of the disk 70 by the engagement of the latch projection 129 or 130 beneath the respective trigger arm 131 or 132 which holds down the respective solenoid core 123 or 124. However, as the disk 70 approaches completion of its scanning operation, one of the cam projections 70ᵃ thereon engages and rocks the lever 138, thereby tilting the trigger upwardly to clear the projection 129 or 130 and thereby release the solenoid core 123 or 124 so that it may rise under the action of its spring and thereby lift one or the other weight from its respective pan.

The construction and operation of the various elements of the registering or recording means having been hereinbefore described in detail, the general operation thereof may be described as follows: Normally, with no load on the scale or weighing apparatus, the outer or free end of the weigh beam 1 will be in its lowered position and the sector 32 will accordingly occupy its lowered position with its unslotted or non-light transmitting upper portion opposite to the slot 41 so that no light is transmitted through the sector to the photoelectric cell 50 and consequently the solenoids 63—0 and 63—9 will be deenergized and the adding machine or equivalent recording or registering device 60 will be inactive.

When a load is placed in a hopper or on a platform or any other suitable part of the scale or weighing apparatus connected to the rod 5, the consequent pull on this rod acts to lift the outer or free end of the scale beam, against the action of the pendulum weight 18 until the latter balances the load on the weigh beam and the latter is in equilibrium. This action of the weigh beam, operating through the rod 10 and tape 13, rotates the shaft 15 thereby swinging the sector 32 upwardly to an extent determined according to the weight of the load on the scale, and this upward swing of the sector brings into register with the slot 41 the slot or window in the column or series 35 corresponding with the units of weight of the load, the slot or window in the column or series 34 corresponding with the "tens" of units of weight of the load and the slot or window in the column or series 33 corresponding with the "hundreds" of units of weight of the load, assuming the weight of the load is represented by numerals or figures of three decimals or denominations.

While the scale or weighing apparatus is coming to a balance, the disk 70 is stationary, with its slot 71 near the adjacent end of the slot 41 so that no light is transmitted, during this operation, through the slots in the sector corresponding to the different numerical denominations to the photoelectric cell 50. However, when the scale or weighing apparatus comes to a balance, the appropriate slot of window in the row or column 36 on the sector comes to rest in register with the slot 41, and a steady and strong beam of light from the lamp 42 will pass through the slot 41, the slots 36 and 71 registering therewith, and to the filament or electrode 36ᵃ of the photoelectric cell, thereby starting the motor 76 as hereinbefore described, assuming the switch 86 has been closed, and causing rotation of the disk 70 in a direction to cause the slot 71 therein to traverse the length of the slot 41 behind the sector 32, causing beams of light from the lamp 42 and passing through the slot 41 to be transmitted in sequence first through the slot or window in the "units" series or column 35 of the sector which registers with the slot 41, then through the slot or window in the "tens" series or column 34 which registers with the slot 41, and then through the slot or window in the "hundreds" series or column 33 which registers with the slot 41. These beams of light will strike, in the same sequence stated, the corresponding filaments or electrodes in the banks or series 35ᵃ, 34ᵃ and 33ᵃ of the photoelectric cell, thereby causing energization of the corresponding solenoids and actuation of the keys of the adding machine 60 in the same sequence. For example, if the weight of the load on the scale or weighing machine is 297 pounds, as indicated in Fig. 8, a beam of light will pass first through the slot or window of the "units" column or series 35 in the sector corresponding to the numeral "7" and will strike the corresponding light sensitive electrodes of the bank 35ᵃ in the photoelectric cell and cause actuation of the #7 key of the adding machine; a beam of light will next pass through the slot or window in the "tens" column or series 34 in the sector corresponding to the numeral "9" and will strike the corresponding light sensitive electrodes in the bank 34ᵃ in the photoelectric cell and cause actuation of the #9 key of the adding machine; and a beam of light will next pass through the slot or window in the "hundreds" series or column 33 in the sector corresponding to the numeral "2" and will strike the corresponding light sensitive electrodes in the bank 33ᵃ in the photoelectric cell and will cause actuation of the #2 key of the adding machine. The number "297"

is thus set up or registered in the adding machine and this number will be printed by actuation of the operating crank 62 in the manner usual and well known in adding machines of the ten-key type. Upon completion of the registering and printing of the number corresponding to the weight of one load, rotation of the disk 70 is stopped by the engagement of one of its cam projections 70ᵃ with the lever 87, rocking the switch 86 to stop the motor, the disk coming to rest with the other of its slots 71 in starting position at the end of the slot 41, in readiness to traverse this slot after the scale or weighing machine receives the next load to be weighed, and the various loads are weighed and registered or recorded in the same manner described in the example, although the different loads may vary in weight, it being understood that the sector 32 returns to its lower position when the load is removed from the scale, and that it is lifted to various extents according to the various weights of the loads placed on the scale. If a slot in the "units" row of the sector corresponding to the numeral "0" or "9" is scanned, the error preventing means is automatically brought into operation, as has been hereinbefore described.

Figs. 14 and 15 show the invention applied to an adding machine of the well known key controlled crank operated type having a keyboard containing a plurality of rows of keys, each row containing nine keys corresponding with the numerals 1 to 9 inclusive, a tenth key being unnecessary in this type of adding machine since it prints "0" when the crank is operated if no key in one or another of the rows is depressed. An adding machine of this type is shown diagrammatically at 140 in Fig. 14 and in the example shown, in which three rows of keys are illustrated as an example, although obviously a greater number of rows of keys may be employed, the right hand row of keys is provided with a set of solenoids 141—1 to 141—9 for depressing the keys in that column, the next row of keys to the left is provided with a set of solenoids 142—1 to 142—9 for depressing the keys in that row, and the left hand row of keys is provided with a set of solenoids 143—1 to 143—9 for depressing the keys in that row. The solenoids 141—1 to 141—9 which when energized operate the keys in the right hand row which may correspond to "units," are connected respectively by an individual set of wires 144 to the corresponding filaments or electrodes of the group 35ᵃ in the photoelectric cell 50 which may be the same in construction as that previously described in connection with Figs. 1 to 13 inclusive; the solenoids 142—1 to 142—9 for actuating the keys in the middle row and which may represent "tens" are connected respectively, by an individual set of wires 145, to the corresponding filaments or electrodes in the group 34ᵃ in the photoelectric cell 50; and the solenoids 143—1 to 143—9 in the third or left-hand row are connected respectively by an individual set of wires 146 to the corresponding filaments or electrodes in the group 33ᵃ in the photoelectric cell 50. An amplifier 55ᵃ, which may be of the well known type commonly used for amplifying the currents of photoelectric cells or as used in radio receivers as amplifiers, is interposed in these circuits between the solenoids of the adding machine and the photoelectric cell, this amplifier being, for example, similar to the amplifier 55 employed in the previously described arrangement, but having a separate amplifying circuit for each filament and its corresponding solenoid.

Although, in using an adding machine of the type shown in Fig. 14, it is necessary to employ only nine of the electrodes in each of the groups 33ᵃ, 34ᵃ and 35ᵃ in the photoelectric cell and the corresponding separate circuits therefor for the actuation of the keys since, as previously stated, no key actuation is required to register or print "0" in this type of adding machine, the "units" group of electrodes contains an electrode corresponding to the numeral "0," and the slotted screen or sector 32 which is employed in this embodiment of the invention contains ten slots in the "units" row, corresponding to zero, and the solenoid 125 previously described for preventing errors when the "9" slot is scanned is connected in the circuit in series with the solenoid 141—9 which actuates the #9 key in the "units" column of the adding machine, and the solenoid 126 is connected to the electrode in the "units" bank of the photoelectric cell corresponding to "0", so that these solenoids will function to prevent errors in the same manner hereinbefore described when a slot corresponding to either the numeral "9" or "0" is scanned.

In applying the invention to an adding machine of the type shown in Fig. 14, the disk 70 is employed to exclude light from the photoelectric cell 50 and thereby prevent actuation of the adding machine keys until the scale has come to balance as previously described, and to cause the "units" slots in the sector 32 to be scanned first and thus actuate the appropriate key in the "units" column after which the "tens" and "hundreds" slots are scanned to actuate the keys in the "tens" and "hundreds" columns, and the total number will be registered and printed when the operating handle or lever is actuated in the manner usual in adding machines of this type. The mode of operation of the arrangement disclosed in Figs. 14 and 15 is otherwise substantially the same as has already been described with reference to Figs. 1 to 13 inclusive.

The present invention is applicable to adding machines or similar registering or recording devices which are operated electrically to print or register the total number representing the weight of a load after each setting up of such number by the keys thereof, instead of being operated by a lever or other manual means, and in applying the invention to such machines of the electrically operated type, the weights of the loads are printed or registered automatically upon the completion of each weighing operation.

The means as shown in Fig. 11 for accomplishing this purpose comprises a lever 150 which is pivoted at 151 to a suitable support such as that indicated at 89, one end of this lever being provided with a weight 152 which normally holds its opposite end in raised position and in the path of the peripheral projections 70ᵃ on the disk 70. This lever carries a mercury switch 153 which controls the operating circuit 155 of a solenoid 156 which may actuate the usual key 157 controlling the electric motor which operates the machine to print the weights, in place of the lever previously described. In employing such an automatic electric operating means for the adding machine, the latter will be held inactive by the lever 150 which, in its normal position, holds the switch 153 in open condition. However, as the disk 70 rotates, after a weighing operation has been completed, to scan the slots in the sector and thereby actuate the keys of the adding machine to set up the numbers corresponding to the weighed load, one of the projections 70a on the disk 70 will strike the adjacent end of the lever 150 and thereby rock it in a direction to momentarily close the switch 153, thereby causing the solenoid 156 or equivalent means to operate the adding machine to print or register the weight. As soon as the projection 70a passes the lever 150, it is automatically restored to its normal position by the weight 152, so that the switch 153 is held open until after the next weighing operation has been completed.

The present invention provides means applicable to various types of scales or weighing apparatus for directly registering or recording the weights of the different loads with accuracy and without error. The screen or sector having the slots or windows graduated therein in accordance with various weights is responsive to the weighing movements of the scale without imposing a frictional or other load thereon that would impair the accuracy of the weighing operation, and the separate or individual filaments or electrodes provided in the photoelectric cell and the separate or individual circuits which connect them to their respective solenoids insure correct actuation of the keys of the adding machine or equivalent registering or recording device according to the position assumed by the graduated screen at each weighing, thus avoiding errors due to actuation of the wrong key or keys.

The shutter disk provided insures exposure of the photoelectric cell to light from the graduated scale operated screen only after the scale has come to a balance, thereby avoiding premature actuation of the registering or recording device and consequent error, and by setting this shutter disk into operation under control of the scale and after the latter has come to balance, the operation of the scale is rendered automatic.

Since the registering or recording device is operated electrically under the control of light, the scale may be operated rapidly without any delay occasioned by the registering or recording of the different weighings, especially as the scanning of the slots or windows in the graduated screen is accomplished quickly after the screen has been brought into position in accordance with the weighing operation and in relation to a photoelectric cell which is relatively fixed, so that the complication and delay that would be involved in moving the photoelectric cell to scan the screen are avoided.

The multiple electrode photoelectric cell provided by the present invention and employed in combination with the corresponding graduated screen greatly simplifies the apparatus required since only one cell is required, and as the graduated slots or windows in the screen sector are spaced apart radially in correspondence with the spacing apart of the filaments or electrodes of the photoelectric cell, the apparatus may be built very compactly.

In applying the registering or recording means as an attachment to any usual or other scale or weighing apparatus of the manually controlled type as herein shown, the operation thereof is rendered automatic, the pendulum weight swinging upwardly to various extents in accordance with the various weights of the loads placed on the scale, so that balancing of the scale for the different loads by manual adjusting of poises is unnecessary.

In applying the invention to a scale or weighing apparatus of the type in which the load is balanced by a pendulum, spring or other means forming part of the scale or weighing apparatus, it will not be necessary to provide the pendulum weight herein shown, it being only necessary to attach the slotted segment to a part of the scale or weighing apparatus so that it will be moved to different extents in accordance with the weighing movements of the scale or weighing apparatus under the influence of the different loads placed thereon.

Although it is generally preferable to record the numbers representing the amoutns of the different loads weighed by the scale or weighing apparatus, as by printing the same on a tape, ticket or other medium by the employment of an adding machine as herein described, it is to be understood that the invention is applicable to calculating machines or other counting mechanism for registering or indicating the amounts of the weighed loads, and also for totalizing them or, performing subtracting or other operations if such is desired, and that the term "registering" as employed in the claims comprehends indicating and/or printing.

Obviously, the invention enables the registering or recording of the weights of the different weighed loads to be done at a distance from the scale or weighing apparatus, as, for example, in an office which is remote therefrom, it being only necessary to extend the wires from the amplifier to the solenoids of the adding machine or other registering or recording device located at the remote point.

I claim:

1. In a registering device for weighing apparatus having a screen movable into different positions in accordance with different loads weighed by the weighing apparatus and having groups of light transmitting areas in accordance with units of weight and corresponding with different numerical denominations, a source of light, a member having a slot with which areas of different groups on the screen are adapted to register for exposing such areas to light from said source, a scanning member having an aperture movable along said slot for exposing to light the areas of the screen which register therewith, and photoelectric means positioned to receive light from said slot and from the areas of the screen exposed by the aperture in the scanning member.

2. In a registering device for weighing apparatus having a screen movable into different positions in accordance with different loads weighed by the weighing apparatus and having groups of light transmitting areas in accordance with units of weight and corresponding wtih different numerical denominations, a source of light, a member having a slot with which areas of different groups on the screen are adapted to register for exposing such areas to light from said source, a rotatable scanning disk having an aperture therein movable longitudinally of said slot for exposing to light successively the areas of the groups which register with said slot, and photoelectric means positioned to receive light from said slot and from the areas of the screen exposed by the aperture in the scanning disk.

3. In a registering device for weighing apparatus having a screen movable into different positions in accordance with different loads weighed by the weighing apparatus and having groups of light transmitting areas in accordance with units of weight and corresponding with different numerical denominations, a source of light, a member having a slot with which areas of different groups on the screen are adapted to register for exposing such areas to light from said source, a scanning member having an aperture movable along said slot for exposing to light the areas of the screen which register therewith, photoelectric means positioned to receive light from said slot and from the areas of the screen exposed by the aperture in the scanning member, and means controlled by the screen and photoelectric means for setting the scanning member into operation.

4. In a registering device for weighing apparatus having a screen movable into different positions in accordance with different loads weighed by the weighing apparatus and having groups of light transmitting areas according with units of weight and corresponding with different numerical denominations, a source of light, a member having a slot with which areas of different groups on the screen are adapted to register for exposing such areas to light from said source, a scanning member having an aperture movable along said slot, for exposing to light the areas of the screen which register therewith, photoelectric means positioned to receive light from said slot and from the areas of the screen exposed by the aperture in the scanning member, the screen having a row of supplemental light transmitting areas adapted to receive light from said slot and transmit such light through said aperture in the scanning member to the photoelectric means when the scanning member is in its starting position, and means including a photoelectric element positioned to receive light from said supplemental areas for setting the scanning member into operation.

5. In a registering device for weighing apparatus having a screen movable into different positions in accordance with different loads weighed by the weighing apparatus and having groups of light transmitting areas according with units of weight and corresponding with different numerical denominations, a source of light, a member having a slot with which areas of different groups on the screen are adapted to register for exposing such areas to light from said source, a scanning member having an aperture movable along said slot for exposing to light the areas of the screen which register therewith, photoelectric means positioned to receive light from said slot and from the areas of the screen exposed by the aperture in the scanning member, and means controlled by the exposure of the photoelectric means through certain of the areas of said groups by the aperture in the scanning member for imparting an under or over motion to the screen.

MANUEL MARTÍNEZ DE CASTRO.